(12) United States Patent
Habibvand

(10) Patent No.: US 8,021,053 B2
(45) Date of Patent: Sep. 20, 2011

(54) ROTARY WING AIRCRAFT BALL BEARING

(75) Inventor: Alex Habibvand, Orange, CA (US)

(73) Assignee: Roller Bearing Company of America, Inc., Oxford, CT (US)

( * ) Notice: Subject to any disclaimer, the term of this patent is extended or adjusted under 35 U.S.C. 154(b) by 308 days.

(21) Appl. No.: 11/704,762

(22) Filed: Feb. 8, 2007

(65) Prior Publication Data
US 2007/0211979 A1 Sep. 13, 2007

Related U.S. Application Data

(60) Provisional application No. 60/782,308, filed on Mar. 13, 2006.

(51) Int. Cl.
*F16C 33/37* (2006.01)
*F16C 19/20* (2006.01)

(52) U.S. Cl. ......... 384/521; 384/520; 384/551; 384/490

(58) Field of Classification Search .................. 384/470, 384/520, 527, 530, 551, 604, 469, 521, 490; 29/898.067; 416/100, 112, 114
See application file for complete search history.

(56) References Cited

U.S. PATENT DOCUMENTS

| | | | | |
|---|---|---|---|---|
| 1,405,894 A | * | 2/1922 | Borg | 384/520 |
| 2,124,078 A | | 7/1938 | Palmer et al. | |
| 2,861,849 A | * | 11/1958 | Case | 384/527 |
| 2,893,792 A | * | 7/1959 | Wikoff et al. | 384/520 |
| 2,897,021 A | * | 7/1959 | Zeilman | 384/520 |
| 2,915,129 A | * | 12/1959 | Laskowitz | 416/20 R |
| 2,961,051 A | | 11/1960 | Burke et al. | |
| 2,987,350 A | * | 6/1961 | Hay | 384/470 |
| 3,144,908 A | * | 8/1964 | Pascher | 416/112 |
| 3,208,806 A | * | 9/1965 | Grolmann et al. | 384/520 |

(Continued)

FOREIGN PATENT DOCUMENTS

FR 2798708 3/2001

(Continued)

OTHER PUBLICATIONS

Office Action for Canadian Application No. 2,581,805 dated Feb. 6, 2009.

*Primary Examiner* — Marcus Charles
(74) *Attorney, Agent, or Firm* — Michaud-Kinney Group LLP

(57) ABSTRACT

In a rotary wing aircraft tail rotor head assembly having a ball bearing on a spindle at the head of a rotor wing, the ball bearing contains slug ball separators between the balls in the bearing. The separator may be made from PEEK, PTFE, or polyimide. The ball-to-ball separation between two balls of like diameter provided by the separator may about 3.2 to about 64% of the diameter of one of the balls. A separator may have an annular configuration that defines a passage therethrough, the passage having two ends and the interior of the separator being tapered to define a maximum diameter at each end and a minimum diameter therebetween. The taper of the chamfered surface of the slug ball separator may define a conical angle of about 75° to about 120°. A ball bearing as described herein may also be used in a rotary wing aircraft swashplate having a stationary plate, a rotating plate; and a thrust bearing between the stationary plate and the rotating plate.

10 Claims, 3 Drawing Sheets

U.S. PATENT DOCUMENTS

| | | | |
|---|---|---|---|
| 3,220,785 A * | 11/1965 | Noll et al. | 384/604 |
| 3,841,586 A | 10/1974 | Broadley et al. | |
| 4,175,805 A * | 11/1979 | Becker et al. | 384/520 |
| 4,249,862 A | 2/1981 | Waddington et al. | |
| 5,074,494 A * | 12/1991 | Doolin et al. | 244/17.25 |
| 5,597,243 A * | 1/1997 | Kaiser et al. | 384/551 |
| 5,927,858 A * | 7/1999 | Agari | 384/520 |
| 6,095,009 A * | 8/2000 | Takagi | 74/424.88 |
| 6,113,274 A * | 9/2000 | Horimoto | 384/521 |
| 6,352,367 B1 * | 3/2002 | Konomoto et al. | 384/520 |
| 6,443,620 B1 * | 9/2002 | Chiu et al. | 384/45 |
| 6,513,978 B2 * | 2/2003 | Shirai et al. | 384/520 |
| 6,616,335 B2 * | 9/2003 | Niwa et al. | 384/51 |
| 6,643,932 B2 * | 11/2003 | Takagi et al. | 29/898.03 |
| 6,644,140 B2 * | 11/2003 | Akido | 384/51 |
| 6,805,019 B2 * | 10/2004 | Miyaguchi et al. | 74/424 |
| 6,821,604 B2 * | 11/2004 | Kasuga et al. | 384/521 |
| 7,146,869 B2 * | 12/2006 | Miyaguchi et al. | 74/89.32 |
| 7,159,481 B2 * | 1/2007 | Miyaguchi et al. | 384/521 |
| 7,222,553 B2 * | 5/2007 | Okita et al. | 74/424.88 |
| 7,246,947 B2 | 7/2007 | Thompson | |
| 2002/0155009 A1 | 10/2002 | Panos et al. | |

FOREIGN PATENT DOCUMENTS

JP     2001-214930 A * 8/2001

* cited by examiner

ROTARY WING AIRCRAFT BALL BEARING

CROSS-REFERENCE TO RELATED APPLICATION

This application claims the benefit of U.S. Provisional Patent Application Ser. No. 60/782,308 filed Mar. 13, 2006, which is hereby incorporated by reference herein in its entirety.

FIELD OF THE INVENTION

This invention relates to ball bearings, and in particular, to ball bearings in rotary wing aircraft.

BACKGROUND

Rotary wing aircraft, such as helicopters, provide unique environments for the use of ball bearings, particularly in their rotor systems. For example, the bearings in helicopter swashplates and in rotor blade mounts must be specially designed to provide reliable ongoing use under the type of load and speed conditions that are unique to helicopters. The use of bearings in other types of machines is nonanalogous to rotary wing aircraft bearings in general and to helicopter bearings in particular. For this reason, bearing designs that are useful in other kinds of machines are not assumed by those of ordinary skill in the art to be suitable for helicopter swashplates, rotor blade mounts, etc.

One example of a conventional rotary wing aircraft bearing is in the tail rotor blade mount of a Sikorsky CH53A/D helicopter. The blade mount includes a 5-bearing stack of ball bearings in which the balls are held in place by a nylon cage. To accommodate the cage, the outer rings of the bearings must be chamfered, which weakens the bearings.

SUMMARY

In a rotor head assembly of a rotary wing aircraft, the rotor head assembly comprising a ball bearing on a spindle at the head of a rotor wing, the ball bearing comprises slug ball separators between the balls in the bearing.

In various optional aspects, a slug ball separator may comprise a synthetic polymeric material compliant with U.S. military specification MIL-P-46183, and may optionally be selected from the group comprising PEEK, PTFE, and polyimide. The ball-to-ball separation between two balls of like diameter in contact with a slug ball separator may be about 6% of the diameter of one of the balls. However, the present invention is not limited in this regard as ball-to-ball separation may be employed without departing from the broader aspects of the present invention. For example, other embodiments may employ a slug ball separator that provides a ball-to-ball separation of about 3.2% to about 64% of a ball diameter. A slug ball separator may have an annular configuration that includes an interior surface defining a passage therethrough. The passage has two ends and the interior surface is tapered to define a minimum internal diameter between the two ends. The interior surface may include a chamfered surface at each end, and the chamfered surface may conform to a conical angle of about 75° to about 120°, for example, about 90°.

A ball bearing as described herein may also be used in a rotary wing aircraft swashplate comprising a stationary plate, a rotating plate; and a thrust bearing between the stationary plate and the rotating plate.

DETAILED DESCRIPTION OF THE INVENTION

This invention provides an improvement to rotary wing aircraft rotor system bearings such as helicopter swashplate bearings and rotor blade mount bearings by providing a ball bearing for such uses in which the bearing comprises slug ball separators between balls in the bearing, rather than a bearing cage.

As a result of this invention, a ball bearing meeting the same design constraints as a prior art caged ball bearing can employ larger balls and obviates the need to chamfer either of the races. In addition, under the conditions specific to the rotary wing aircraft, the resulting bearing has a surprisingly increased dynamic load rating and fatigue life.

Figure 1:
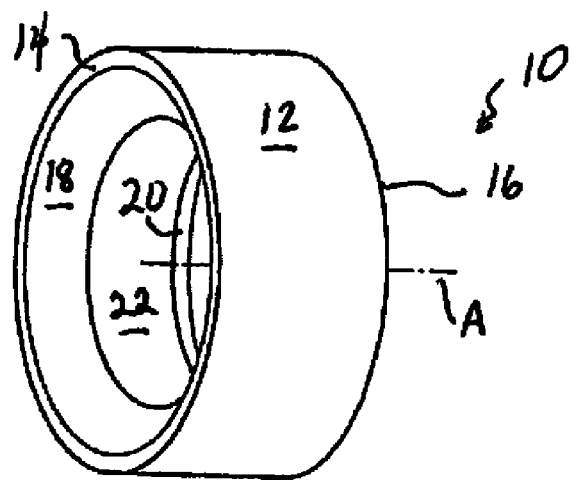
FIG. 1 is a perspective view of one embodiment of a slug ball separator.
Figure 2:
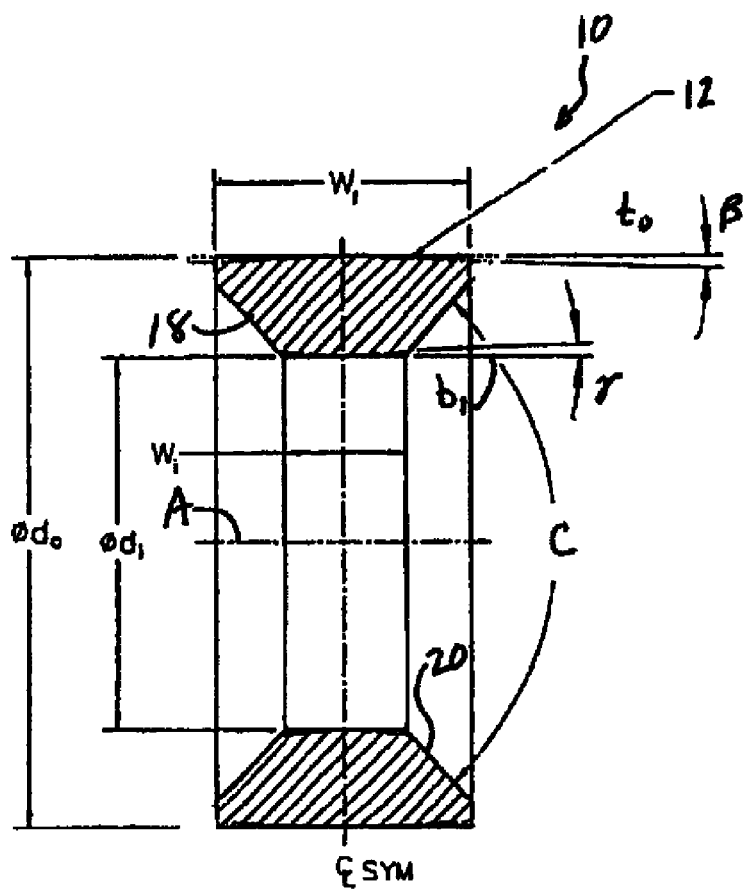
FIG. 2 is a cross-sectional view of the slug ball separator of FIG. 1.

One embodiment of a slug ball separator useful in the present invention is shown in FIG. 1. and FIG. 2. Slug ball separator 10 has a generally annular configuration about a central axis A, two ends and a passage therethrough. The slug ball separator 10 further has a generally cylindrical exterior surface 12 having an external diameter $d_o$, axial end faces 14 and 16, and conical chamfered surfaces 18 and 20 that converge from the end faces 14, 16 towards a generally cylindrical interior surface 22 having an internal diameter $d_i$. Chamfered surfaces 18 and 20 may conform to a conical angle C of about 75° to about 120°, for example, about 90°. Interior surface 22 extends for a distance $W_i$ from the narrow end of chamfered surface 18 to the narrow end of chamfered surface 20.

Exterior surface 12 may be contoured so that its diameter is at a maximum between the end faces; for example, exterior surface 12 may define an angle β of about 3° relative to a tangent line $t_o$ thereon that is parallel to axis A. The diameter $d_o$ of surface 12 from axis A thus decreases moving from the tangent point, which is preferably midway between the end faces, towards either end face. Similarly, interior surface 22 may be contoured to define an angle γ of about 3° relative to a tangent line $b_i$ thereon that is parallel to axis A. Accordingly, the diameter $d_i$ of interior surface 22, measured from axis A, increases moving towards either end face from the tangent point, which is preferably midway between the end faces. The contoured surfaces provided by angles facilitate removal of the slug ball separator 10 from the mold in which it is formed.

Slug ball separator 10 has an axial length $W_f$ measured from end face 14 to end face 16. In a particular embodiment, slug ball separator 10 is designed to be substantially symmetric about a radial centerline CL.

Slug ball separator 10 may be formed from a synthetic polymeric material such as bearing grade PEEK (poly ether ether ketone) or other material e.g., PTFE (polytetrafluoroethylene) (such as TEFLON®), polyimide (such as Dupont's VESPEL®), etc. In particular embodiment, the material is compliant with U.S. military specification MIL-P-46183 as amended 1 Jul. 1999. Preferably, the material will conform to Society of Automotive Engineers, Inc. (SAE) Aerospace Material Specification AMS 3656E issued 15 Jan. 1960, revised 1 Jul. 1993 or AMS 3660C issued March 1966, revised February 1994.

Figure 3:
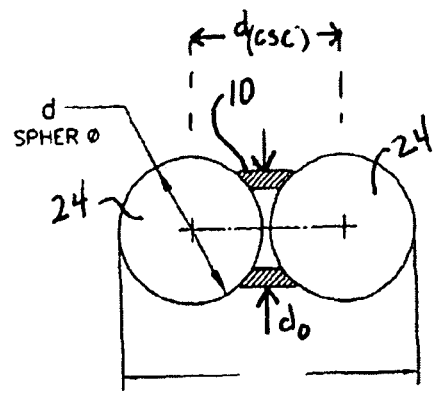
FIG. 3 is a partly cross-sectional view of two balls separated by the slug ball separator of FIG. 1.

Typically, a slug ball separator 10 is used between two like-sized balls that are sized to engage the conical chamfered surfaces 18 and 20. As seen in FIG. 3, the diameter d(spher) of each ball 24 is larger than the outer diameter $d_o$ of slug ball separator 10. In the illustrated embodiment, the ratio of diameter $d_o$ to the ball diameter d(spher) is about 0.85:1. In addition, the slug ball separator 10 is configured to provide a separation between the balls that is equal to about 3.2% to about 64% of a ball diameter, optionally about 3.2 to about 9.6% or, in a specific example, about 6% of a ball diameter. Thus, in a particular embodiment, the center-to-center distance d(csc) of balls in contact with, but separated by, the slug ball separator 10 is about 1.06 times a ball diameter.

Figure 4:
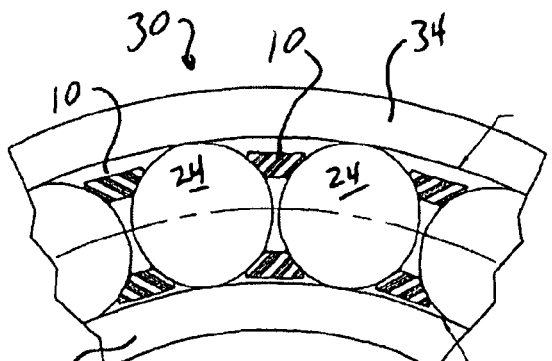
FIG. 4 is a partly cross-sectional view of a ball bearing for use in a rotary wing system as described herein.

A ball bearing 30 comprising slug ball separators is shown in the partial view of FIG. 4, which shows balls 24 between inner race 32 and outer race 34 and separated from each other by slug ball separators 10. As indicated above, due to the use of slug ball separators 10, ball bearing 30 provides a surprising improvement over a prior art caged ball bearing for the same rotary wing aircraft because it allows the use of a larger ball (e.g., the use of a ball of 12.7 mm (½ in.) diameter where the prior art bearing employed a ball of 11.9 mm (15⁄32 in.) diameter, and the races are stronger than in the prior art bearing because there is no need to chamfer either race to accommodate a cage. In contrast to a caged bearing, the slug ball separators orbit and flow with minimal resistance to lead-and-lag motions of balls 24 as bearing 30 rotates. These advantages are achieved without impact on bearing features such as contact angle, pitch diameter and the number of balls in the bearing.

Figure 5:
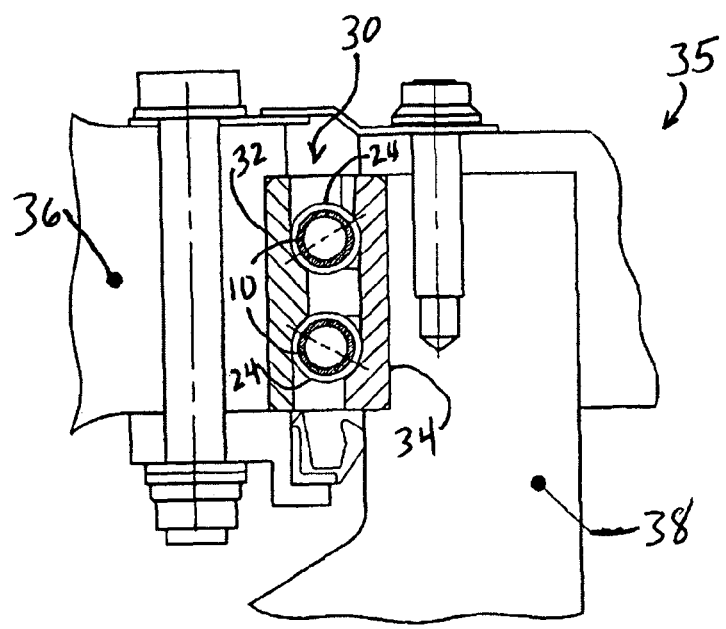
FIG. 5 is a partly cross-sectional, partly broken-away view of a swashplate assembly comprising the bearing of FIG. 4.

A ball bearing having slug ball separators instead of a nylon cage can be employed in a rotary wing aircraft swashplate. As is known in the art, a swashplate generally comprises a stationary plate mounted on a mast and a rotating plate mounted on the mast in juxtaposition to the stationary plate. There is a thrust bearing between the stationary plate and the rotating plate to facilitate rotation of the rotating plate. The thrust bearing comprises an inner race and an outer race and a plurality of balls between the inner race and the outer race. In the prior art, the balls were kept in place by a cage. In keeping with the present invention, the bearing comprises slug ball separators between the balls. Thus, the bearing 30 of FIG. 4 is seen in FIG. 5 as a thrust bearing portion of a swashplate assembly. The swashplate assembly 35 comprises a stationary inner swashplate member 36 and a rotating outer swashplate member 38. The inner race 32 of bearing 30 is in contact with the stationary swashplate member 36 and the outer race 34 is in contact with the rotating outer swashplate member 38. Between the inner race 32 and the outer race 34, the bearing 30 comprises a plurality of balls 24 that are separated by slugs 10. The use of slug ball separators yields a dynamic load rating increase of about 14.5% and a bearing fatigue life increase of about 50% over a bearing having a nylon cage for the balls, according to formulations established in Anti-Friction Bearing Manufacturer Association, Inc. Standard number 9-1990.

Figure 6:
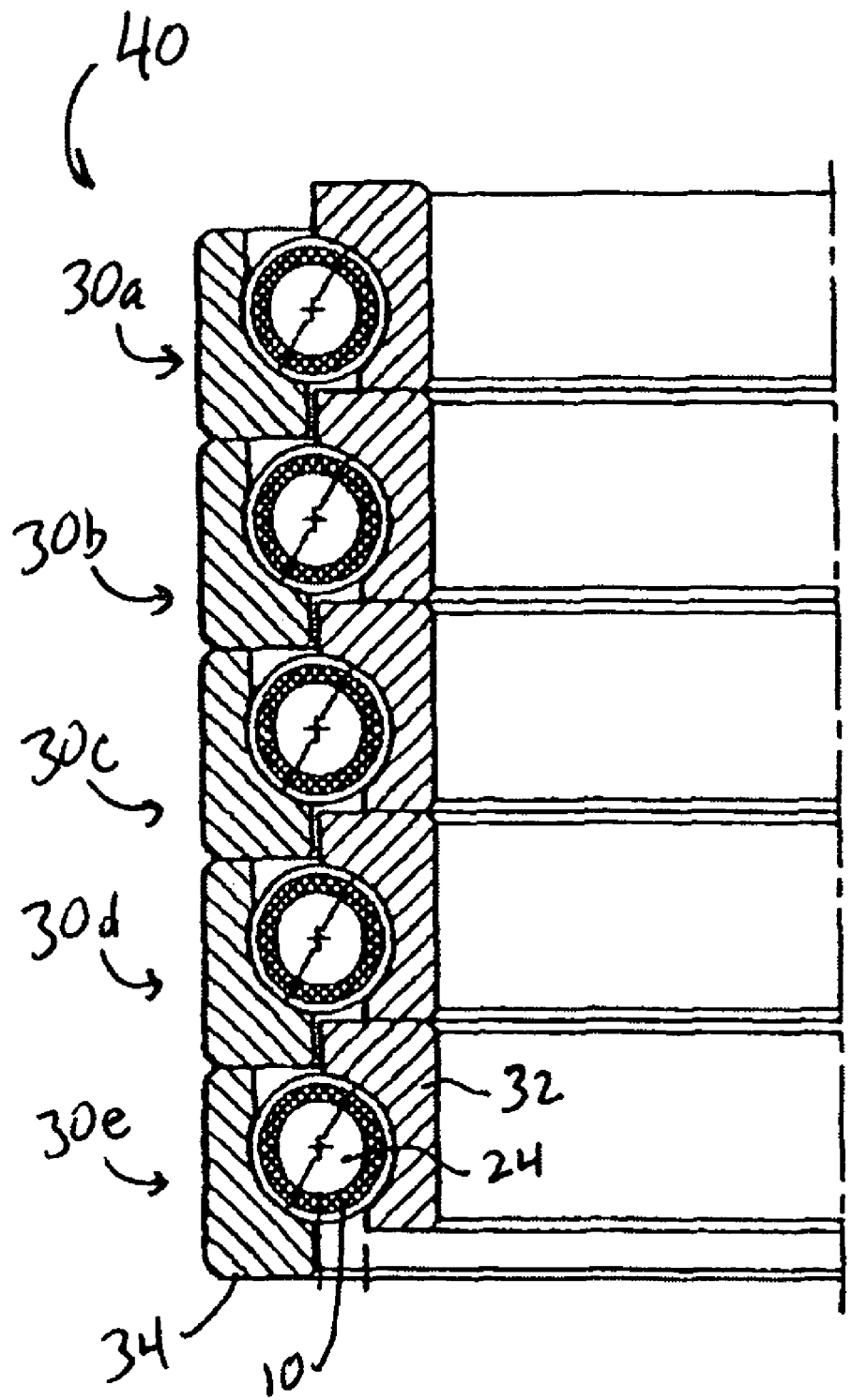
FIG. 6 is a partly cross-sectional view of a ball bearing stack in a rotary wing aircraft tail rotor head assembly.

In another embodiment, the present invention is utilized in the bearing of a rotary rotor mount. For example, FIG. 6 provides a cross-sectional view of a bearing stack useful in a rotary wing aircraft tail rotor head assembly for a Sikorsky CH53A/D helicopter. Each of the four rotor blades of the tail rotor assembly is fitted with a bearing stack on a respective spindle attached to the rotor head. Bearing stack 40 comprises five matched ball bearings 30a-30e all utilizing the same size balls 24 separated by slug ball separators 10 and dispose between inner races 32 and outer races 34 as described herein. Bearing stack 40 is a sub-component of the tail rotor head assembly that permits the blade to rotate in response to rudder control input. The manufacturer material specification for the rings is AMS 6440 or AMS 6441; the specification for the balls is AMS 6440 or SAE51100. In one evaluation, the use of PEEK or PTFE slug ball separators as described herein resulted in an increase of the dynamic load rating of the bearing by about 14% and an increase of the fatigue life by about 50% relative to the use of nylon cage in the bearing.

Unless otherwise specified, all ranges disclosed herein are inclusive and combinable at the end points and all intermediate points therein. The terms "first," "second," and the like, herein $d_o$ not denote any order, quantity, or importance, but rather are used to distinguish one element from another. The terms "a" and "an" herein do not denote a limitation of quantity, but rather denote the presence of at least one of the referenced item. All numerals modified by "about" are inclusive of the precise numeric value unless otherwise specified.

Although the invention has been described with reference to particular embodiments thereof, it will be understood by one of ordinary skill in the art, upon a reading and understanding of the foregoing disclosure, that numerous variations and alterations to the disclosed embodiments will fall within the spirit and scope of this invention and of the appended claims.

What is claimed is:

1. A swashplate comprising:
   a rotating member;
   a stationary member; and
   a thrust bearing comprising:
      an inner race;
      an outer race;
      a first ball and a second ball, the first ball and the second ball being disposed between the inner race and the outer race and the first ball having a diameter substantially equal to a diameter defined by the second ball;
      a slug ball separator disposed between the first ball and the second ball, the slug ball separator comprising a first cylindrical portion, a second cylindrical portion disposed within the first cylindrical portion, and a frustoconical surface between the first cylindrical portion and the second cylindrical portion, and wherein
      the inner race is coupled to the stationary member and the outer race is coupled to the rotating member, the slug ball separator provides a separation distance between the first ball and the second ball, the separation distance being equal to about 3.2% to about 64% of the diameter defined by the first ball.

2. The swashplate according to claim 1, wherein the slug ball separator is comprised of a synthetic polymeric material.

3. The swashplate according to claim 2, wherein the synthetic polymeric material is comprised of PEEK.

4. The swashplate according to claim 2, wherein the synthetic polymeric material is comprised of PTFE or polyimide.

5. The swashplate according to claim 1, wherein the slug ball separator comprises an annular configuration that defines a passage therethrough and that has two ends, the annular configuration includes an interior surface, the interior surface being tapered to a minimum internal diameter between the two ends.

6. The swashplate according to claim 1, wherein the separation distance between the first ball and the second ball is equal to about 3.2% to about 9.6% of the diameter of the first ball.

7. The swashplate according to claim 6, wherein the separation distance between the first ball and the second ball is equal to about 6% of the diameter of the first ball.

8. The swashplate according to claim 1, wherein the diameter of the first ball and the second ball is about 12.7 mm.

9. The swashplate according to claim 1, wherein the diameter of the first ball is larger than an outer diameter of the slug ball separator.

10. The swashplate according to claim 9, wherein a ratio of the outer diameter of the slug ball separator to the diameter of the first ball is about 0.85:1.

* * * * *